United States Patent
Miyamoto et al.

(10) Patent No.: US 7,255,943 B2
(45) Date of Patent: Aug. 14, 2007

(54) GLASS SUBSTRATE FOR A MAGNETIC DISK, MAGNETIC DISK, AND METHODS OF PRODUCING THE GLASS SUBSTRATE AND THE MAGNETIC DISK

(75) Inventors: Takemi Miyamoto, Tokyo (JP); Masao Takano, Tokyo (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 10/844,518

(22) Filed: May 13, 2004

(65) Prior Publication Data

US 2005/0008822 A1 Jan. 13, 2005

(30) Foreign Application Priority Data

May 14, 2003 (JP) ............................. 2003-136516

(51) Int. Cl.
*G11B 5/78* (2006.01)
*G11B 5/71* (2006.01)
*C03B 29/00* (2006.01)

(52) U.S. Cl. .............................. 428/848.2; 428/846.9; 428/410; 451/63

(58) Field of Classification Search ............ 428/846.1, 428/846.9, 847.7, 848.1, 848.2, 848.5, 900, 428/848.8, 410; 65/30.14, 31, 30.1; 451/36, 451/37, 63; 148/220; 360/135
See application file for complete search history.

(56) References Cited

U.S. PATENT DOCUMENTS

| | | | | |
|---|---|---|---|---|
| 6,119,485 A | * | 9/2000 | Hibino et al. ................ | 65/30.1 |
| 6,491,572 B1 | * | 12/2002 | Horie et al. ................... | 451/63 |
| 6,517,642 B2 | * | 2/2003 | Horie et al. ................. | 148/220 |
| 6,533,544 B1 | | 3/2003 | Tiemann et al. | |
| 6,533,644 B1 | * | 3/2003 | Horie et al. ................... | 451/36 |
| 6,869,340 B2 | * | 3/2005 | Horie et al. ................... | 451/63 |
| 2002/0127432 A1 | * | 9/2002 | Saito et al. ........... | 428/694 SG |
| 2003/0044647 A1 | * | 3/2003 | Kavosh et al. ........... | 428/846.1 |
| 2003/0110803 A1 | * | 6/2003 | Saito et al. ................. | 65/30.14 |
| 2003/0219631 A1 | * | 11/2003 | Takahashi et al. .......... | 428/695 |

FOREIGN PATENT DOCUMENTS

| | | |
|---|---|---|
| JP | 64-37714 A | 2/1989 |
| JP | 3-266217 A | 11/1991 |
| JP | 2002-30275 A | 1/2002 |
| JP | 2002-32909 A | 1/2002 |

OTHER PUBLICATIONS

Translation JP 2002-032909.*

* cited by examiner

*Primary Examiner*—Carol Chaney
*Assistant Examiner*—Louis Falasco
(74) *Attorney, Agent, or Firm*—Sughrue Mion, PLLC

(57) ABSTRACT

On a principal surface of a glass disk substrate, a texture comprising a combination of an isotropic texture for stabilizing a flight of a magnetic head flying and traveling over a magnetic disk and an anisotropic texture for imparting a magnetic anisotropy to a magnetic layer of the magnetic disk is formed.

9 Claims, 2 Drawing Sheets

GLASS SUBSTRATE FOR A MAGNETIC DISK, MAGNETIC DISK, AND METHODS OF PRODUCING THE GLASS SUBSTRATE AND THE MAGNETIC DISK

BACKGROUND OF THE INVENTION

This invention relates to a magnetic disk to be loaded in a magnetic disk apparatus, such as a HDD (hard disk drive), a glass substrate for the magnetic disk, and methods of producing the magnetic disk and the glass substrate.

At present, following the rapid development of the IT industry, the information recording technology, in particular, the magnetic recording technology is requested to achieve dramatic technical innovation. For a magnetic disk to be loaded in a HDD (hard disk drive), it is required to develop a technology capable of achieving an information recording density of 40 Gbit/inch$^2$ or more in response to a demand for a higher information capacity.

The magnetic disk is required to be excellent in magnetic characteristic in a flying/traveling direction of a magnetic head. To this end, there is known a technique of forming a concentric texture on a surface of a substrate for a magnetic disk to impart a circumferential magnetic anisotropy to the magnetic characteristic of the magnetic disk, thereby improving the magnetic characteristic as a magnetic recording medium to achieve a higher recording density as described in, for example, Japanese Patent Application Publication (JP-A) No. 2002-30275 (Hereinafter referred to as Reference 1).

Recently, attention is drawn to a glass substrate as a substrate for a magnetic disk, which is suitable for a higher recording density. The glass substrate is suitable for use with a magnetic head of a low flying height because a flat and smooth surface is obtained, and is advantageous in an improvement of a S/N ratio of a recording signal and an increase in recording density. Thus, the glass substrate is excellent in adaptability to a low flying height of the magnetic head.

As the glass substrate of the type, a glass substrate for a magnetic recording medium is described in, for example, Japanese Patent Application Publication (JP-A) No. 2002-32909 (hereinafter referred to as Reference 2) is known.

In the above-mentioned conventional techniques, the substrate for a magnetic disk is provided with the concentric texture so as to improve the magnetic characteristic and a read/write characteristic of the magnetic disk and to contribute to an increase in information capacity.

In a magnetic disk apparatus such as a hard disk drive (HDD), use has been made of a CSS (Contact Start and Stop) system in which a magnetic head is kept in contact with a contact sliding zone (CSS zone) formed on a surface of a magnetic disk in a stopped state while, in a starting operation, the magnetic head slides in the CSS zone in contact with the disk surface to be floated up and, thereafter, a write or a read operation is carried out in a read/write zone of the disk surface outside the CSS zone. In an ending operation, the magnetic head is retreated from the read/write zone to the CSS zone and, thereafter, the magnetic head slides in the CSS zone in contact with the disk surface to be landed and stopped. In the CSS system, the starting operation and the ending operation in which contact sliding movement occurs will be called a CSS operation.

In the magnetic disk of the CSS system, it is necessary to provide both the CSS zone and the read/write zone on the disk surface. In addition, in order to avoid the magnetic head and the magnetic disk from being attracted or stuck to each other when they are contacted, it is necessary to provide the surface of the magnetic disk with a convex/concave shape having a predetermined surface roughness.

As a recent magnetic disk apparatus, a magnetic disk apparatus of a LUL (Load Unload) system is introduced instead of the CSS system which has been used so far. In the LUL system, a magnetic head is retreated on an inclined support, called a ramp, located outside a magnetic disk in a stopped state. In a starting operation, the magnetic head slides from the ramp to the magnetic disk after the rotation of the magnetic disk is started, and flies and travels over the magnetic disk to carry out a write or a read operation. In a stopping operation, the magnetic head is retreated to the ramp outside the magnetic disk and, thereafter, the rotation of the magnetic disk is stopped. A series of the above-mentioned operations will be called a LUL operation.

The LUL system does not require the CSS zone (contact sliding zone for the magnetic head) to be formed on the magnetic disk so that a wide read/write zone is secured on the surface of the magnetic disk as compared with the magnetic disk of the CSS system. Therefore, this system contributes to a higher recording capacity.

In the LUL system, the magnetic head is not brought into contact with the surface of the magnetic disk, unlike the CSS system. Therefore, it is unnecessary to provide the surface of the magnetic disk with the convex/concave shape for preventing attraction so that the surface of the magnetic disk can be extremely flattened and smoothed. Accordingly, with the magnetic disk of the LUL system, the flying height of the magnetic head can be remarkably lowered as compared with the CSS system. This results in an advantage that a high S/N ratio of the recording signal is achieved to contribute to a higher recording capacity of the magnetic disk apparatus.

Following recent introduction of the LUL system, the flying height of the magnetic head is discontinuously remarkably lowered. Consequently, the magnetic disk is required to stably operate even at a very small flying height of 10 nm or less. However, if the magnetic head flies and travels over the surface of the magnetic disk at such a very small flying height, there arises a problem of frequent occurrence of a fly stiction defect or a head corrosion defect.

The fly stiction defect is a defect in which the flying position or the flying height fluctuates while the magnetic head is flying and traveling, often followed by irregular variation in read output. Sometimes, the magnetic head is contacted with the magnetic disk during flying and traveling to cause a head crash defect, resulting in breakage of the magnetic disk. The head corrosion defect is a defect in which an element portion of the magnetic head is corroded to cause a trouble in the write or the read operation. Sometimes, the write or the read operation is impossible or the corroded element is expanded to damage the surface of the magnetic disk during flying and traveling. Occurrence of those defects will significantly deteriorate a HDI (Head Disk Interface) reliability of the magnetic head during flying and traveling, for example, a LUL durability, a CFT durability (Constant Flight durability), and a glide characteristic. Further, during flying and traveling, the magnetic head may fall onto the surface of the magnetic disk to be attracted thereto.

The present inventor systematically studied about those defects. As a result, it has been found out that those defects tend to frequently occur if an anisotropic texture (for example, a circumferential texture) for imparting a magnetic anisotropy to a magnetic layer of the magnetic disk is formed on a glass substrate. It is supposed that the anisotropic texture induces the above-mentioned defects related to the HDI reliability while the magnetic head is flying and traveling. Further, it has been found out that these defects tend to frequently occur, in particular, in an inner region of the disk, for example, on a principal surface of the disk in a region within a disk radius of 13 mm, especially, in a region within a disk radius of 12 mm.

SUMMARY OF THE INVENTION

Under the emergence of the above-mentioned new problems, this invention has been made. It is a first object of this invention to provide a substrate for a magnetic disk and a magnetic disk which are capable of preventing a fly stiction defect and a corrosion defect even at a very low flying height of, for example, 10 nm or less and of preventing a defect that a magnetic head falls down during flying and traveling to be attracted to the magnetic disk, and which are therefore high in HDI reliability.

It is a second object of this invention to provide a substrate for a magnetic disk, which is capable of obtaining a magnetic disk high in HDI reliability and having a magnetic anisotropy, thereby obtaining a magnetic disk excellent in magnetic characteristic, read/write characteristic, and HDI reliability so as to contribute to a higher recording density of a HDD.

It is a third object of this invention to provide a magnetic disk particularly suitable for a LUL (Load UnLoad) system and a glass substrate for the magnetic disk.

The present inventor thoroughly studied about the above-mentioned objects. As a result, it has been found out that, when an anisotropic texture (for example, a circumferential texture) for imparting a magnetic anisotropy in a disk circumferential direction to a magnetic layer of a magnetic disk is formed on a glass disk substrate, a magnetic characteristic and a read/write characteristic are improved while a HDI reliability during flying and traveling of a magnetic head is deteriorated. If the HDI reliability is deteriorated, occurrence of a trouble in the HDD is induced. As a result, provision of a magnetic disk high in recording density and reliability is inhibited. On the other hand, if the shape of the anisotropic texture is controlled in order to improve the HDI reliability, the magnetic anisotropy is decreased so that the magnetic characteristic and the read/write characteristic can not be high. Thus, the present inventor found out a problem that, in case where the anisotropic texture is formed, there is a tradeoff between two essential requirements, i.e., the magnetic characteristic and the read/write characteristic necessary for a higher recording density and the HDI reliability also necessary for a higher recording density.

In particular, it has been found out that, in case where a glass substrate for a magnetic disk is flat and smooth with a small surface roughness (for example, a surface roughness Rp of 4 nm or less) and is therefore adaptable to a low flying height (for example, a flying height of the magnetic head being 10 nm or less), a margin for the HDI reliability during flying and traveling of the magnetic head is small and, therefore, the trade-off is further remarkable.

In order to solve the above-mentioned problem, the present inventor studied. As a result, it has been found out that the above-mentioned trade-off can be resolved by forming a texture obtained by cooperatively superposing and combining one texture in which a convex/concave shape is isotropically distributed on a surface of a glass disk (for example, a texture comprising protrusions and recesses continuously or discretely distributed, called an isotropic texture in the present specification) and another texture in which a convex/concave shape is anisotropically distributed on the surface of the glass disk (for example, a stripe texture, called an anisotropic texture in the present specification). Thus, if the texture obtained by superposing and combining the isotropic texture and the anisotropic texture is formed on the glass disk substrate, the anisotropic texture exhibits a function of imparting the magnetic anisotropy to the magnetic layer while the isotropic texture exhibits a function of stabilizing a flight of the magnetic head, i.e., a function of imparting the HDI reliability.

By arranging the anisotropic texture in a circumferential direction of the disk, the magnetic anisotropy (magnetization easy axis) of the magnetic layer is induced in the circumferential direction when at least the magnetic layer is formed on the glass disk substrate. The anisotropic texture may be formed, for example, by mechanical polishing (may be called mechanical texturing).

A mechanism of improving the HDI reliability during a flight of the magnetic head by the use of the texture obtained by superposing the isotropic texture and the anisotropic texture is not clear but is supposed to relate to the fact that, by presence of the isotropic texture, a predetermined surface roughness is formed in a flying/traveling direction of the magnetic head, i.e., in the circumferential direction of the disk. Thus, it is assumed that, since the isotropic texture provides the predetermined surface roughness to a dimension in a relative moving direction of the magnetic head, a meniscus phenomenon following the movement of the magnetic head, for example, migration of contaminants, such as a lubricant, on a disk surface to the magnetic head is suppressed. Accordingly, a flying position of the magnetic head can be stabilized. In case of the anisotropic texture alone, the surface roughness is not substantially provided to the dimension in the circumferential direction of the disk so that the migration of the contaminants, such as the lubricant, to the magnetic head is promoted. Therefore, the flying height or the flying position of the magnetic head is disturbed, resulting in occurrence of the above-mentioned problem such as the fly stiction defect.

In the above-mentioned respect, it is understood that the present invention exhibits a remarkable effect, particularly, upon the magnetic head of a low flying height. This is because the migration is promoted if the flying height of the magnetic head is low.

Further, it is understood that a more remarkable effect is exhibited in case where a magnetic head comprising a NPAB (Negative Pressure Air Bearing) slider (may be called a negative pressure slider) is used. This is because he NPAB slider generates a negative pressure on a surface of the slider and easily attracts the contaminants, such as the lubricant, from the disk surface.

Therefore, the present invention has following structures.

(Structure 1) A glass substrate for a magnetic disk, comprising a texture formed on at least an inner region of a principal surface of a glass disk and obtained by cooperatively combining one texture for stabilizing a flight of a magnetic head flying and traveling over a magnetic disk and another texture for imparting a magnetic anisotropy to a magnetic layer of the magnetic disk.

(Structure 2) A glass substrate for a magnetic disk, which is obtained by forming, on a principal surface of a glass disk, one texture for stabilizing a flight of a magnetic head flying and traveling over a magnetic disk and thereafter forming another texture for imparting a magnetic anisotropy to a magnetic layer of the magnetic disk.

(Structure 3) A glass substrate for a magnetic disk according to structure 1 or 2, wherein the ratio Ra(r)/Ra(c) of a surface roughness Ra(r) in a radial direction of the disk with respect to a surface roughness Ra(c) in a circumferential direction of the disk is greater than 1 and Ra(c) is 0.2 nm to 0.8 nm.

(Structure 4) A glass substrate for a magnetic disk according to any one of structures 1 through 3, wherein the glass substrate is a glass disk comprising an aluminosilicate glass.

(Structure 5) A magnetic disk comprising a glass substrate according to any one of structures 1 through 4 with at least a magnetic layer, a protection layer, and a lubrication layer formed on the glass substrate.

(Structure 6) A method of producing a glass substrate for a magnetic disk, wherein, on a principal surface of a glass disk, one texture for stabilizing a flight of a magnetic head flying and traveling over the magnetic disk is formed and, thereafter, another texture for imparting a magnetic anisotropy to a magnetic layer of the magnetic disk is formed by mechanical polishing.

(Structure 7) A method of producing a glass substrate for a magnetic disk according to structure 6, wherein the texture for stabilizing the flight of the magnetic head flying and traveling over the magnetic disk is formed by chemical surface treatment of the glass disk.

(Structure 8) A method of producing a glass substrate for a magnetic disk according to structure 6 or 7, wherein the texture by mechanical polishing is formed by tape polishing.

(Structure 9) A method of producing a glass substrate for a magnetic disk according to any one of structures 6 through 8, wherein chemical strengthening is carried out after the texture for stabilizing a flight of the magnetic head flying and traveling over the magnetic disk is formed on the principal surface of the glass disk and, thereafter, the texture by mechanical polishing is formed.

(Structure 10) A method of producing a glass substrate for a magnetic disk according to any one of structures 6 through 9, wherein the glass substrate is a glass disk comprising an aluminosilicate glass.

(Structure 11) A method of producing a magnetic disk, wherein at least a magnetic layer, a protection layer, and a lubrication layer are successively formed on a glass substrate obtained by a method according to any one of structures 6 through 10.

DESCRIPTION OF THE PREFERRED EMBODIMENT

Figures 1A, 1B:
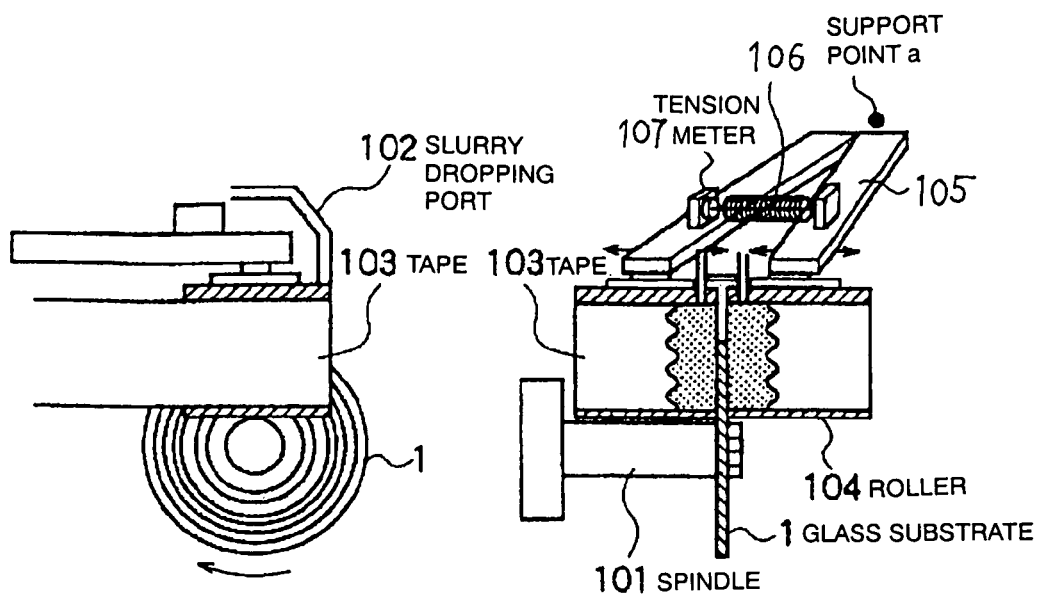
FIGS. 1A and 1B are a side view and a front perspective view of a characteristic part of a tape polishing apparatus, respectively.

Now, description will be made of an embodiment of this invention.

In this invention, a texture obtained by superposing an isotropic texture and an anisotropic texture preferably has a surface roughness such that the ratio Ra(r)/Ra(c) between a surface roughness Ra(r) in a disk radial direction and a surface roughness Ra(c) in a disk circumferential direction is greater than 1 and Ra(c) is between 0.2 nm and 0.8 nm.

It is noted here that the surface roughness Ra represents an arithmetic average roughness (may be referred to as a center-line average roughness). When at least a magnetic layer is formed on a glass disk substrate, the magnetic layer is provided with a magnetic anisotropy in the disk circumferential direction (i.e., a magnetization easy axis in the disk circumferential direction) if the ratio Ra(r)/Ra(c) of the surface roughness is greater than 1.

In particular, in order to achieve an information recording density of 40 gigabits or more per 1 square inch, the ratio Ra(r)/Ra(c) of the surface roughness is desirably equal to 1.1 or more. With the above-mentioned range, the magnetic anisotropy is reliably obtained. The ratio Ra(r)/Ra(c) of the surface roughness need not have a specific upper limit. Practically, however, in view of suppression of the surface roughness as a whole and achievement of a low flying height of a magnetic head, Ra(r)/Ra(c) is 3 or less.

Preferably, the surface roughness Ra(c) in the disk circumferential direction is 0.2 nm or more. This is because the surface roughness of 0.2 nm or more assures a predetermined surface roughness to a dimension in a flying/traveling direction of the magnetic head. With the above-mentioned range, it is possible to assure an improvement in HDI reliability during flying and traveling of the magnetic disk.

As far as the above-mentioned range of Ra(r)/Ra(c) is satisfied, Ra(c) need not have a specific upper limit. Practically, however, 0.8 nm or less is preferable.

On the other hand, the surface roughness Ra(r) in the disk radial direction need not have specific upper and lower limits as far as the above-mentioned range of Ra(r)/Ra(c) is satisfied. However, in view of achievement of stable read/write operations and a HDI reliability (particularly, a glide characteristic) even if the flying height of the magnetic head is 10 nm or less, the range of 0.2 nm to 0.8 nm is preferable.

In this invention, if the surface roughness Rp in each of the disk circumferential direction and the radial direction is 4 nm or less, a flat surface roughness suitable for a low flying height (flying height of 10 nm or less) of the magnetic head is obtained.

It is noted here that various parameters used as the surface roughness in this invention are calculated according to the Japanese Industrial Standard (JIS) B0601. Rmax is a maximum height (may be referred to as Ry) defined by a sum (Rp+Rv) of a height (maximum peak height: Rp) from an average line to a highest peak and a depth (maximum valley depth: Rv) from the average line to a deepest valley. Ra is an arithmetic average roughness (may be referred to as center-line average height).

As the surface roughness in this invention, it is preferable to use an area roughness measured by an atomic force microscope (AFM). This is because the use of the atomic force microscope makes it possible to precisely measure a fine and minute surface profile of a surface of a substrate and is therefore preferable in this invention. The use of the area roughness is advantageous because a three-dimensional surface profile is recognized. Because a HDI (Head Disk Interface) phenomenon occurs as an interaction between a head surface (particularly, an ABS surface of the magnetic head) and a disk surface (particularly, a principal surface of the magnetic disk) as a three-dimensional structure. ABS is an abbreviation of an Air Bearing Surface which is a surface applying a lift force to the magnetic head by a fluid bearing (air bearing).

An area for the area roughness in this invention is preferably a rectangular region of 1 square μm. By the use of the surface roughness in a rectangular region of 1 square μm, a fine and minute surface profile can accurately be represented.

As a measurement region of the atomic force microscope (AFM) in this invention, it is preferable to selectively measure an inner peripheral region on the principal surface of the disk. In other words, in this invention, it is preferable to calculate the surface roughness based on the surface profile of the inner peripheral region of the principal surface of the disk. As the measurement region of the atomic force microscope (AFM), for example, a region within 13 mm in disk radius is preferably selected. A region within 12 mm in disk radius is especially preferable.

This is because, in the above-mentioned region, the problem to be solved by this invention tends to occur as described above and this invention is highly useful. The reason why the problem to be solved by this invention tends to occur in the above-mentioned region is supposed as follows. Specifically, in the inner peripheral region of the disk (for example, in the region within 13 mm in disk radius), the effect of the air bearing of the magnetic head tends to be unstable. This is because the effect of a curvature added in a traveling direction of the surface of the magnetic disk as seen from the magnetic head is increased. For facilitating an understanding, it is explained, by way of example, that the traveling direction of the disk following the rotation of the disk is more curved at the position of 13 mm in radius as compared with the position of 30 mm in radius. Therefore, the stream of air flowing into a slider and flowing out of the slider tends to be unstable. Since the balance between a positive pressure and a negative pressure tends to be unstable, the magnetic head tends to be disturbed in flying position and to fall down.

As a glass used as a glass disk in this invention, an amorphous glass or a crystallized glass may be used. For the amorphous glass, an isotropic texture can be formed under precise control, for example, by chemical surface treatment (for example, etching using fluorosilicic acid or hydrofluoric acid) or laser texturing (for example, bump formation using a $CO_2$ laser or the like). For the crystallized glass, the shape of the isotropic texture can be controlled by controlling the size, the shape, and the protruding height of crystal grains. Alternatively, laser texturing may be used. On the other hand, as an anisotropic texture, for example, a circumferential stripe texture may be formed by mechanical polishing. In particular, the amorphous glass is highly useful in that precise texturing is easy because of absence of distribution of the crystal grains on its surface.

As a glass composition of the glass disk in this invention, use may be made of an aluminosilicate glass, a soda lime glass, a quartz glass, a glass containing cristobalite or lithium disilicate, and so on. Among others, the aluminosilicate glass is highly practical in view of workability and rigidity.

As the aluminosilicate glass, use is preferably made of, for example, an aluminosilicate glass which at least contains alkali metal oxide and alkaline earth metal oxide and in which the content of the alkaline earth metal oxide is smaller than 3 mol %. On the above-mentioned aluminosilicate glass, a suitable isotropic texture can be formed under precise control via chemical surface treatment, such as fluorosilicic treatment. As the glass of the type, use is advantageously made of an aluminosilicate glass containing 58-75 wt % $SiO_2$, 5-23 wt % $Al_2O_3$, 3-10 wt % $Li_2O$, and 4-13 wt % $Na_2O$ as main components.

In order to form the isotropic texture in this invention, use may be made of a method of chemically treating a surface of the glass disk, a method of carrying out laser texturing, or a method of arranging crystal grains on a surface of the glass. Among others, formation of the isotropic texture by the chemical treatment is highly practical in view of the cost and the accuracy. In addition, the chemical treatment is highly useful because a relatively flat surface roughness can be formed under precise control.

As the chemical surface treatment mentioned above, a method of contacting the glass disk with a chemical solution is preferable. As the chemical solution, use is advantageously made of a chemical solution, such as fluorosilicic acid or hydrofluoric acid, having an etching function for the glass. In case where fluorosilicic acid is used, an appropriate isotropic texture can be formed if the concentration of fluorosilicic acid is 0.15-3.0 wt %. Preferably, the time of contact with the chemical solution of the fluorosilicic acid is selected within a range between 30 seconds and 90 seconds and the temperature is selected within a range between 15° C. and 60° C.

In this invention, the isotropic texture preferably has a surface roughness of 2 nm to 10 nm in Rmax, 1 nm to 5 nm in Rp, and 0.2 nm to 1 nm in Ra. If the surface roughness is greater, the HDI reliability (particularly, the glide characteristic) may be deteriorated. On the contrary, if the surface roughness is flatter, the HDI reliability (particularly, the LUL durability, the CFT durability, the falling/attracting defect during a flight of the head) may not be obtained.

In order to form the anisotropic texture in this invention, use is preferably made of a method of forming a mechanical texture (a texture by mechanical polishing). Upon formation of the mechanical texture on a glass disk, no specific limitation is imposed. Practically, however, the mechanical texture is preferably formed by tape polishing. By the tape polishing, a circumferential texture can suitably be formed. For example, the tape polishing may be carried out by the use of a tape polishing apparatus illustrated in FIGS. 1A and 1B. In the illustrated apparatus, a tape is pressed against a principal surface of a glass disk while the glass disk is rotated so as to form the circumferential texture on the disk. The tape polishing apparatus is used in examples which will later be described.

When the mechanical texture is formed, abrasive grains may be supplied, for example, by a method of supplying free abrasive grains or a method of supplying, together with the tape, fixed abrasive grains adhered to the tape. As the abrasive grains, diamond abrasive grains may preferably be used. As the polishing tape, a fabric tape may be used. Preferably, a woven or a non-woven fabric is used.

In this invention, a texture obtained by cooperatively superposing and combining an isotropic texture and an anisotropic texture is formed on a surface of a glass disk. In order to form such superposed textures, it is preferable that the isotropic texture is first formed on a principal surface of the glass disk and thereafter the anisotropic texture is formed on the isotropic texture. In this manner, a magnetic disk obtained by forming a magnetic layer and the like on the glass disk achieves a HDI reliability during flying and traveling of a magnetic head even at a low flying height of 10 nm or less. In addition, a magnetic anisotropy is imparted to the magnetic layer so as to achieve a magnetic characteristic and a read/write characteristic which are stable and high. On the contrary, if the anisotropic texture is first formed and thereafter the isotropic texture is formed thereon, a fine profile of the anisotropic texture first formed may be disturbed so that the magnetic anisotropy may not reliably be imparted to the magnetic layer.

The degree of superposition of the isotropic texture and the anisotropic texture in this invention is not specifically limited as far as the effect of this invention is not impaired. For example, in case of a combination of an anisotropic texture of a stripe pattern and an isotropic texture comprising concave or convex portions discretely or continuously formed, the concave or the convex portions may be present between adjacent stripes or, alternatively, the concave or the convex portions may be present across the stripes. However, if the concave or the convex portions are excessively large in width as compared with a distance between the adjacent stripes, the magnetic anisotropy may be decreased. On the other hand, if the concave or the convex portions are excessively small in width as compared with the distance between the adjacent stripes, the effect of improving a flight stability of the magnetic head may be insufficient. Therefore, the ratio of the width of the concave or the convex portions with respect to the distance between the adjacent stripes practically falls within a range of 0.1 to 10 times.

In this invention, it is preferable that a chemical strengthening step is interposed between an isotropic texture forming step and an anisotropic texture forming step to chemically strengthen the glass disk. By carrying out chemical strengthening, the rigidity of the substrate can be increased. If the chemical strengthening is carried out, an aluminosilicate glass is preferable as a glass material. If the chemical strengthening step and the anisotropic texture forming step are carried out in this order, foreign matters adhered during ion exchange in the chemical strengthening can be removed by polishing for forming the anisotropic texture. Therefore, the HDI reliability can further be improved. In addition, it is possible to avoid the risk of disturbing a fine profile of the anisotropic texture during the ion exchange in the chemical strengthening.

The chemical strengthening step in this invention is a step of producing compressive stress on the surface of the glass disk according to low-temperature ion exchange.

In this invention, it is preferable that the surface of the glass disk is polished into a mirror surface prior to formation of the isotropic texture. As a mirror polishing method, use is preferably made of mirror polishing using a polishing liquid containing cerium oxide abrasive grains and a polishing pad or mirror polishing using a polishing liquid containing colloidal silica abrasive grains and a polishing pad. As a quality of the mirror surface in this case, the mirror surface preferably has a surface roughness of 5 nm or less in Rmax.

For example, the magnetic disk in this invention may be a magnetic disk obtained by successively forming a magnetic layer, a protection layer, and a lubrication layer on a glass disk substrate. As the magnetic layer, a Co-based magnetic layer having an hcp crystal structure suitable for a higher recording density is preferable. This is because, in the Co-based magnetic layer having an hcp structure, an anisotropic magnetic field (Hk) is high and a magnetization easy axis (c axis) is oriented in the circumferential direction by the anisotropic texture. The magnetic layer of the type may be, for example, a CoPt magnetic layer or a CoCrPt magnetic layer. Preferably, the magnetic layer is formed by DC magnetron sputtering.

Preferably, the protection layer is a carbon-based protection layer. Among various kinds of the carbon-based protection layer, a hydrogenated carbon protection layer and a nitrogenated carbon protection layer are particularly preferable because of high adhesiveness with the lubrication layer. The concentration of hydrogen in carbon is preferably 10 at % to 30 at % if measured by HFS (hydrogen forward scattering) and the concentration of nitrogen in carbon is preferably 4 at % to 12 at % if measured by XPS (X-ray photoelectron spectroscopy). In order to form the protection layer, DC magnetron sputtering or plasma CVD is preferably used.

As the lubrication layer, perfluoropolyether (PFPE) is preferably used. PFPE has a flexible main chain structure so that an appropriate lubricity can be achieved. More preferably, use is made of a PFPE derivative with a polar group introduced into a terminal functional group of PFPE. Such derivative may be alcohol-modified PFPE. Such alcohol-modified substance having a polar group, particularly, a hydroxyl group is high in adhesiveness with the carbon-based protection layer so as to advantageously suppress migration of a lubricant towards the magnetic head, further improving the HDI reliability. Therefore, such alcohol modified substance is particularly suitable in this invention. For example, the lubrication layer may be formed by dipping.

Preferably, the magnetic anisotropy of the magnetic layer in the magnetic disk of this invention in the disk circumferential direction is 1.2 or more if measured as a product (Mr·t) of residual magnetization and film thickness. If the magnetic anisotropy is 1.2 or more, it is possible to favorably achieve an information recording density of 40 gigabits or more per 1 square inch. Herein, the magnetic anisotropy in the disk circumferential direction is a characteristic given by the ratio of the product of residual magnetization and film thickness in the circumferential direction with respect to the product of residual magnetization and film thickness in the radial direction. The product of residual magnetization and film thickness can be measured by a VSM (vibrating sample magnetometer).

This invention is advantageously applied to a glass disk substrate or a magnetic disk having a disk diameter not greater than 65 mm. This is because, in a small-diameter disk which has a diameter not greater than 65 mm, i.e., which is not greater than a 2.5-inch disk (outer diameter of 65 mm–inner diameter of 20 mm), an inner peripheral region, particularly, a region within 13 mm in disk radius has a relatively large area and, therefore, the problem to be solved by this invention tends to occur. In particular, in case of a disk smaller in diameter than 48 mm, i.e., smaller than a 1.8-inch disk, the effect of this invention is further remarkable. It is particularly preferable to use this invention in a small-diameter disk not greater than a 1-inch disk. Thus, this invention is advantageously used in a HDD with such a small-diameter disk mounted thereto, for example, a HDD mounted to a digital camera, a mobile telephone, a car navigation apparatus, or the like and as a substitute for a SD card.

Hereinafter, specific embodiments of this invention will be described in detail in conjunction with examples. However, this invention is not restricted to these embodiments.

EXAMPLE 1

A glass substrate for a magnetic disk in this example is a glass disk having a principal surface provided with a combination of an isotropic texture and an anisotropic texture. The disk has a size as a 1.8-inch disk (outer diameter of 48 mm–inner diameter of 12 mm). Thus, the disk has an outer peripheral end at a position of 24 mm in radius and an inner peripheral end at a position of 6 mm in radius. The glass disk comprises an aluminosilicate glass as an amorphous glass. Hereinafter, description will be made of a method of producing a glass substrate for a magnetic disk in this example.

(1) Lapping Step (Grinding Step)

An amorphous glass disk comprising an aluminosilicate glass and having a diameter of 49 mmφ was obtained from a molten glass by direct pressing. The aluminosilicate glass used herein had a composition of 63.6 wt % $SiO_2$, 14.2 wt % $Al_2O_3$, 10.4 wt % $Na_2O$, 5.4 wt % $Li_2O$, 6.0 wt % $ZrO_2$, and 0.4 wt % $Sb_2O_3$.

Next, the glass disk was subjected to a lapping step for improving a dimensional accuracy and a profile accuracy. The lapping step was carried out by the use of a double-sided polishing apparatus and abrasive grains having a grain size of #400. In detail, opposite surfaces of the glass substrate received in a carrier were lapped to a surface accuracy of 0-1 μm and a surface roughness (Rmax) of 6 μm by using alumina abrasive grains having a grain size of #400 at first, setting a load of about 100 kg, and rotating a sun gear and an internal gear. Then, a center portion of the glass substrate was bored by the use of a cylindrical grindstone and an outer peripheral end face was ground to reduce a diameter into 48 mmφ. Thereafter, the outer peripheral end face and an inner peripheral end face were subjected to predetermined chamfering. At this time, each end face of the glass substrate had a surface roughness of about 4 μm in Rmax.

Next, the abrasive grains were changed into those having a grain size of #1000 and the surfaces of the glass substrate were lapped to obtain the surface roughness of about 2 μm in Rmax and about 0.2 μm in Ra.

(2) Mirror Polishing Step

Then, by brush polishing, the end faces (inner peripheral and outer peripheral) of the glass substrate were polished while the glass substrate is rotated so that thea surface roughness was equal to about 1 μm in Rmax and about 0.3 μm in Ra.

Thereafter, in order to remove a flaw or a distortion left after the lapping step, a first mirror polishing step was carried out by the use of a double-sided polishing method of a planetary gear motion system. In the double-sided polishing apparatus, the glass substrate held by a carrier was interposed between and brought into tight contact with upper and lower surface tables with polishing pads attached thereto as a polisher. The carrier was engaged with a sun gear and an internal gear. The glass substrate was clamped and pressed by the upper and the lower surface tables. Thereafter, a polishing liquid was supplied between the polishing pads and polished surfaces of the glass substrate and rotation was started. Consequently, the glass substrate was rotated and revolved (planetary gear motion) on the surface tables so that the opposite surfaces were simultaneously mirror polished.

More in detail, the polishing step was performed by the use of a polishing pad of a hard polisher (hard urethane foam) as a polisher. As the polishing liquid, free abrasive grains comprising cerium oxide abrasive grains (average grain size of 1.3 μm) dispersed in pure water were used. As the polishing condition, the load was equal to 100 g/cm² and the polishing time was 15 minutes.

Next, by the use of a double-sided polishing apparatus of the type same as that used in the first mirror polishing step, a second mirror polishing step was carried out by the use of a soft polishing pad (suede pad) as a polisher. The second mirror polishing step was intended to reduce the surface roughness to 5 nm or less in Rmax and 0.5 nm or less in Ra while maintaining a flat surface obtained in the first mirror polishing step mentioned above. By this mirror polishing step, each principal surface of the glass substrate was finished into a mirror surface.

As the polishing liquid, free abrasive grains containing cerium oxide abrasive grains (average particle size of 0.8 μm) dispersed in pure water were used. As the polishing condition, the load was equal to 100 g/cm² and the polishing time was 5 minutes.

In the mirror polishing step, each principal surface of the glass substrate was flattened into a mirror surface and, under a polishing pressure applied onto the glass substrate via the abrasive grains, stress distribution was produced in a surface layer portion of the glass substrate. Generally, a part having a high residual stress is formed along a trace of the abrasive grains. In this example, mirror polishing was carried out by the planetary gear motion. Therefore, in the surface layer of the glass substrate, stress distribution was formed in which the part having a high residual stress was isotropically distributed in a continuous or a discrete pattern.

The glass substrate after mirror polishing was cleaned by a cleaning liquid containing sulfuric acid to remove a residue of the abrasive grains or the like, thereby purifying the glass substrate.

The surface roughness of the glass disk substrate obtained as mentioned above was measured by the AFM (atomic force microscope). As a result, it was confirmed that a flat mirror surface having Rmax of 4.0 nm, Rp of 2.1 nm, Rv of 1.9 nm, and Ra of 0.4 nm was obtained. As a measurement region, a square region of 1 μm×1 μm was measured. As a measurement position, a position of 12.0 mm in disk radius on the principal surface of the disk was measured.

Hereinafter, the surface roughness was calculated according to the Japanese Industrial Standard (JIS) B0601 from the result of measurement of a surface region by the AFM (atomic force microscope). Rmax, Rp, Rv, and Ra are defined as mentioned above.

(3) Isotropic Texturing Step

Next, in order to provide an isotropic texture on the glass disk thus obtained, chemical surface treatment was carried out. Specifically, the glass substrate was subjected to chemical surface treatment using fluorosilicic acid (concentration: 0.5 wt %, treating time: 90 seconds, temperature: 40° C.). After the chemical surface treatment, ultrasonic cleaning was carried out by the use of a neutral detergent, pure water, and isopropyl alcohol.

Figure 2:
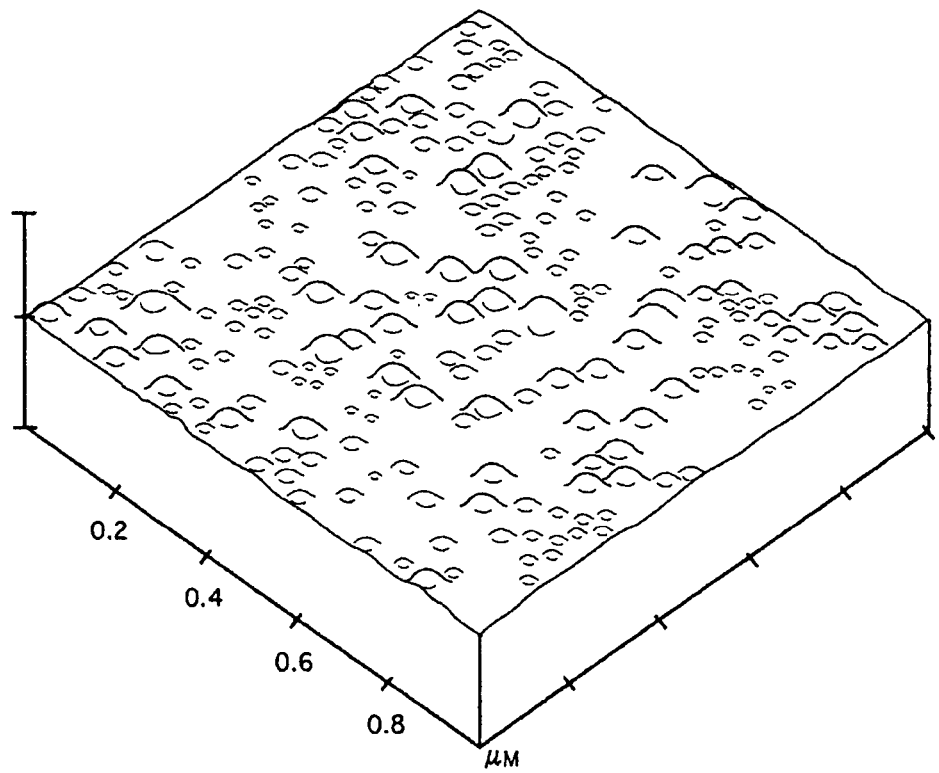
FIG. 2 is a view showing a result of surface measurement by an AFM after formation of an isotropic texture in Example 1.

The surface of the glass disk thus obtained was similarly measured by the AFM (see FIG. 2). As seen from FIG. 2, it was confirmed that an isotropic texture (a texture comprising convex portions discretely distributed) was formed on the surface. The surface roughness was 8.0 nm in Rmax, 4.5 nm in Rp, 3.5 nm in Rv, and 0.9 nm in Ra. It is supposed that the isotropic texture was formed as protrusions (convex portions) at those parts having relatively high residual distortion in residual stress distribution produced along a trace of polishing by the free abrasive grains in the mirror polishing step of the glass disk.

(4) Chemical Strengthening Step

Next, a chemical strengthening step by low-temperature ion exchange was carried out in the following condition.

The chemical strengthening was carried out by preparing a chemical strengthening salt comprising a mixture of potassium nitrate (60%) and sodium nitrate (40%), heating the chemical strengthening salt to 380° C., and dipping the glass substrate after cleaned and dried into the chemical strengthening salt for 240 minutes. By the chemical strengthening step, high compressive stress is produced on the surface of the glass disk so as to obtain the glass substrate excellent in shock resistance.

The glass disk after the chemical strengthening was successively dipped into cleaning tanks respectively filled with sulfuric acid, a neutral detergent, pure water, pure water, IPA, and IPA (vapor dry) to be cleaned and then dried.

Then, the surface of the glass substrate after the above-mentioned cleaning was subjected to visual inspection and precise examination utilizing reflection, scattering, and transmission of light. As a result, no defect such as a protrusion by an adhered matter or a flaw was found out on the surface of the glass substrate.

(5) Anisotropic Texturing Step

Next, an anisotropic texture was formed on the glass substrate. The anisotropic texture was formed by mechanical polishing as a texture in a circumferential stripe pattern so as to provide a magnetic anisotropy in the circumferential direction of the disk.

Upon forming the texture, a single-substrate tape polishing method apparatus was used. The single-substrate tape polishing apparatus is shown in FIGS. 1A and 1B. As a polishing tape, a woven tape was used. A material of the tape was a fabric of polyester fiber. As a polishing liquid, free abrasive grains containing polycrystalline diamond having an average grain size of 0.12 μm were used.

In the tape polishing apparatus, a glass disk (substrate) 1 fixed to a spindle 101 is rotated and the polishing liquid is supplied to tapes (polishing tapes) 103 from a slurry (abrasive grains) dropping port 102. Opposite surfaces of the glass disk 1 are clamped by the tapes 103 wound around rollers 104 so as to form a circumferential texture on each principal surface of the glass disk 1. The rollers 104 with the tapes 103 wound therearound are rotated at a predetermined rotation speed so that a new surface of each tape 103 is continuously contacted with the glass disk 1. In this case, the spindle 101 can be wobbled. Plate-like members 105, 105 fixed to shafts of the rollers 104 are moved around a support point a so that the glass disk 1 is clamped. At this time, a load applied to the glass disk 1 is determined by a force of a spring 106 extended between the plate-like members 105. The load is measured by a tension meter 107.

By adjusting a substrate rotation speed (spindle rotation speed) and a texturing time in this apparatus, the shape of the texture can be adjusted.

Under the above-mentioned condition, polishing as mechanical anisotropic texturing was carried out at a substrate rotation speed of 300 rpm for 20 seconds.

Figure 3:
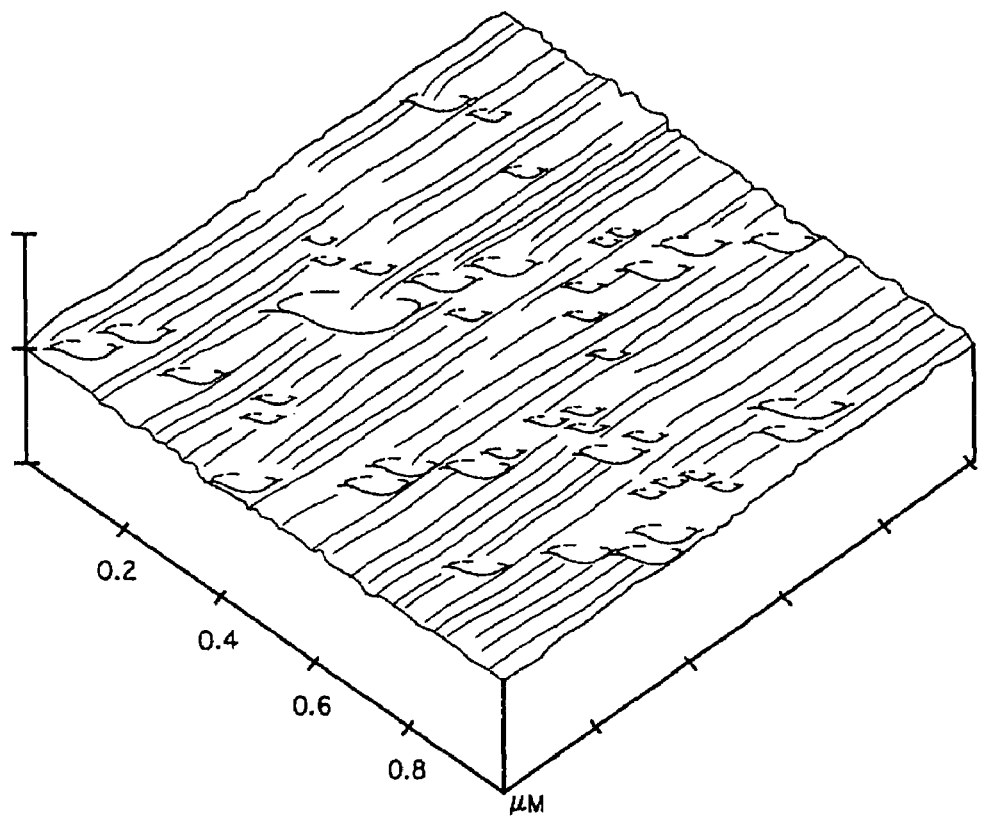
FIG. 3 is a view showing a result of surface measurement by the AFM when an anisotropic texture was formed after formation of the isotropic texture in Example 1.

Thereafter, the surface roughness of the glass disk substrate was measured by the use of the AFM. The result is shown in FIG. 3. As seen from FIG. 3, a texture comprising a combination of the isotropic texture and the anisotropic texture superposed on each other was formed.

The surface roughness was 4.5 nm in Rmax, 2.0 nm in Rp, and 2.5 nm in Rv. Ra(r)/Ra(c) was 1.3. Ra(c) was 0.20 nm and Ra(r) was 0.26 nm.

As described above, the glass substrate for a magnetic disk in this example was obtained.

The glass substrate thus obtained was a 1.8-inch glass disk having an outer diameter of 48 mm, an inner diameter of 12 nm, and a thickness of 0.508 mm. Thus, it was possible to produce the glass substrate suitable for a magnetic disk, which assures a suitable magnetic anisotropy when at least a magnetic layer is formed on the glass substrate and which is excellent in HDI reliability.

EXAMPLE 2

Next, a magnetic disk in this example was produced in the following manner.

Figure 4:
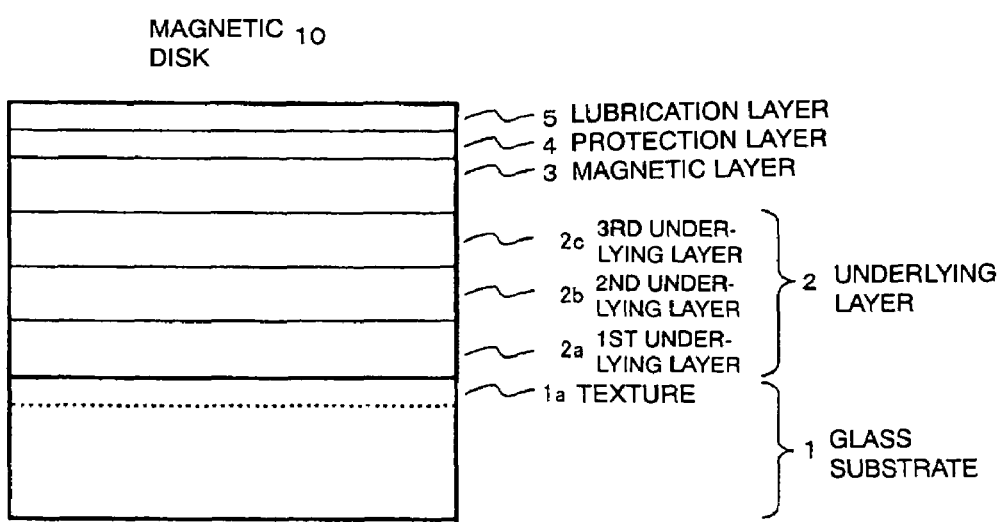
FIG. 4 is a schematic sectional view of a magnetic disk in Example 2.

The magnetic disk in this example comprises the glass substrate for a magnetic disk obtained in Example 1 with a magnetic layer, a protection layer, and a lubrication layer successively formed thereon. A schematic sectional view is shown in FIG. 4. In FIG. 4, a reference numeral 1 represents the glass substrate, 2, an underlying layer, 3, a magnetic layer, 4, a protection layer, and 5, a lubrication layer. On the surface of the glass substrate 1, a texture 1a obtained by superposing the isotropic texture and the anisotropic texture mentioned above is formed. The underlying layer 2 comprises a first underlying layer 2a, a second underlying layer 2b, and a third underlying layer 2c.

Next, a method of producing the magnetic disk will be described.

On the glass substrate 1 with the above-mentioned texture 1a formed thereon, the underlying layer 2 and the magnetic layer 3 were successively formed by DC magnetron sputtering in an argon atmosphere.

The first underling layer 2a comprises an amorphous metal underlying layer. By forming the amorphous metal underlying layer in contact with the glass in conformity with an amorphous nature of the glass substrate, the effect of the texture 1a can suitably be propagated to the magnetic layer 3. The material of first underlying layer 2a was a CrTi metal alloy. Next, the second underlying layer 2b was deposited. The second underlying layer 2b was a B2 crystalline structure metal underlying layer. The second underlying layer 2b has a function of uniformly miniaturizing magnetic grains in the magnetic layer and exhibits the effect of improving the magnetic characteristic. As the material of the second underlying layer 2b, an AlRu metal alloy was used. Then, the third underlying layer 2c was deposited. The third underlying layer has a function of orienting the magnetic grains of the magnetic layer within a disk plane. A CrW metal alloy was used.

Next, the magnetic layer 3 was deposited. As the material of the magnetic layer, a CoCrPtB alloy as a ferromagnetic layer was used.

On the magnetic disk with the magnetic layer 3 deposited thereon, the protection layer 4 was deposited by plasma CVD. Specifically, a hydrogenated carbon protection layer was formed by the use of an acetylene gas. The thickness was 5 nm. The content of hydrogen was measured by HFS (hydrogen forward scattering) and was equal to 20 at %.

On the protection layer 4, the lubrication layer 5 was formed. Specifically, a lubricant comprising a perfluoropolyether compound having hydroxyl groups at opposite ends of a main chain was applied. The thickness was 1 nm. After depositing the lubrication layer 5, heat treatment was carried out at 100° C. so that the lubrication layer 5 was adhered to the protection layer 4 in tight contact.

In the above-mentioned manner, the magnetic disk 10 was obtained.

Next, the magnetic disk thus obtained was evaluated for various characteristics.

At first, in order to measure the magnetic characteristic, evaluation was carried out by the use of a VSM. As a result, it was confirmed that the magnetic anisotropy was induced in the disk circumferential direction. The ratio of the magnetic anisotropy (the ratio of the product of residual magnetization and film thickness in the circumferential direction with respect to the product of residual magnetization and film thickness in the radial direction) was 1.24.

Next, the read/write characteristic (electromagnetic conversion characteristic) were measured. Specifically, a read output (S) was measured at a recording density (F1) of 700 kfci. A medium noise (N) was obtained by integrating noise power from a DC region to a level of about 1.2 times F1 by the use of a spectrum analyzer. As a result, the S/N ratio was as excellent as 32.1 dB was obtained.

Then, the HDI reliability was evaluated. A LUL (Load UnLoad) HDD (hard disk drive) was prepared. The HDD was of a type having a recording density of 40 gigabits per 1 square inch. A magnetic head having an NPAB slider and a GMR read element was mounted to the HDD. The NPAB slider tends to promote migration of contaminants such as a lubricant towards the magnetic head. The GMR read element is susceptible to a corrosion defect. The magnetic head mounted had a flying height of 10 nm. The magnetic disk 10 was mounted to the HDD and evaluated.

At first, a LUL durability text was carried out by consecutive LUL operations. As a result, the magnetic disk withstood consecutive 600,000 times of LUL operations without occurrence of a failure or a defect. It is said that, in case where a HDD commercially available is used in an ordinary condition, about ten years of use will be required until the number of times of LUL operations exceeds 400,000. Thus, it is understood that the magnetic disk of this invention exhibits a high HDI reliability.

Next, a CFT test (constant flight test) was carried out. A constant point was determined in an inner region (a position of 12 mm in disk radius) of the disk. As a result, the magnetic disk withstood consecutive constant flights for consecutive 1440 hours. During this period, any failure or defect did not occur.

The LUL durability test and the CFT durability test were carried out under a severe environment at a temperature of 60° C. and a relative humidity of 80%.

Next, in order to evaluate the glide characteristic, a glide test by a touch down height method was carried out. As a result, it was confirmed that the head was not contacted with the magnetic disk to the flying height of 4.5 nm. In the glide test, a disk radius position was a position of 12 mm.

In each of the LUL durability test, the CFT durability test, and the glide characteristic test, no fly stiction defect during a flight of the magnetic head occurred. The flying position and the flying height of the magnetic head were stable.

Thus, by the use of the substrate for a magnetic disk according to this invention, it is possible to achieve an excellent HDI reliability during a flight of the magnetic head even if the anisotropic texture is formed. Therefore, it is possible to provide an excellent magnetic disk which satisfies all of the magnetic characteristic, the read/write characteristic, and the HDI reliability. Consequently, this invention contributes to a higher recording density of the HDD.

COMPARATIVE EXAMPLE 1

Next, a glass substrate for a magnetic disk in Comparative Example 1 was produced. Specifically, the glass substrate was produced in the manner similar to Example 1 except that the isotropic texturing step in Example 1 was not carried out.

The glass substrate for a magnetic disk thus obtained was observed by the AFM. As a result, it was confirmed that a regular circumferential texture (anisotropic texture) was uniformly formed. The surface roughness was 3.8 nm in Rmax, 2.0 nm in Rp, and 1.8 nm in Rv. Ra(r)/Ra(c) was 1.9. Ra(c) was equal to 0.14 nm and Ra(r) was equal to 0.27 nm.

On the glass substrate for a magnetic disk in the comparative example, successive deposition was carried out in the manner similar to Example 2 to obtain a magnetic disk.

Evaluation was carried out in the manner similar to Example 2. For the magnetic characteristic and the read/write characteristic, results similar to Example 2 were obtained. However, for the LUL durability, a failure occurred after 300,000 times. Analyzing the failure, a fly stiction defect and a head corrosion defect occurred. In the LUL durability test, the flying height and the flying position of the magnetic head were disturbed by the fly stiction defect. In particular, the frequency of occurrence of the defect was higher in an inner region (within 12 mm in disk radius). For the CFT durability, a failure occurred after 240 hours. The reason of the failure was examined. As a result, it was supposed that the magnetic head fell down and was attracted to the surface of the magnetic disk during continuously flying and traveling over the inner region (within 12 mm in disk radius).

COMPARATIVE EXAMPLE 2

Next, a glass substrate for a magnetic disk in Comparative Example 2 was produced. Specifically, the glass substrate was produced in the manner similar to Example 1 except that the anisotropic texturing step in Example 1 was not carried out.

The glass substrate for a magnetic disk thus obtained was observed by the AFM. As a result, it was confirmed that an isotropic texture (a texture comprising convex portions discretely distributed) was formed. The surface roughness was 7.0 nm in Rmax, 3.5 nm in Rp, 3.5 nm in Rv, and 0.7 nm in Ra. Ra(r)/Ra(c) was 0.97. Ra(c) was 0.71 nm and Ra(r) was 0.69 nm.

On the substrate for a magnetic disk in this comparative example, successive deposition was carried out in the manner similar to Example 2 to obtain a magnetic disk.

Evaluation was carried out in the manner similar to Example 2. For the LUL durability and the CFT durability, results similar to Example 2 were obtained. However, the ratio of the magnetic anisotropy was 1.0. This means that the magnetic layer was not provided with the magnetic anisotropy. The read/write characteristic (S/N ratio) was 25.7 dB, which was considerably deteriorated as compared with Example 2. For the glide characteristic, the touch down height was 7.2 nm, which was considerably deteriorated as compared with Example 2. For example, in case where the magnetic head has a flying height of 10 nm, the touch down height is required to be equal to 5 nm or less in order to reliably prevent a thermal asperity defect and a crash defect. Since the touch down height is high when the isotropic texture alone is formed, a safe operation may not be assured.

As described above in detail, according to this invention, the texture obtained by superposing the isotropic texture and the anisotropic texture is formed on the glass substrate. Therefore, even in the magnetic disk in which the magnetic layer is provided with the magnetic anisotropy, an excellent HDI reliability can be achieved. Therefore, it is possible to avoid the problem of tradeoff among various characteristics including the magnetic characteristic, the read/write characteristic, and the HDI characteristic and to contribute to a higher recording density.

What is claimed is:

1. A glass substrate, wherein said glass substrate is useable for a magnetic disk comprising a texture formed on at least an inner region of a principal surface of a glass disk, wherein the texture is obtained by cooperatively superposing and combining a first texture comprising at least one of protrusions and recesses, which are continuously or discretely distributed and a second texture for imparting a magnetic anisotropy to a magnetic layer of the magnetic disk, wherein a ratio Ra(r)/Ra(c) of a surface roughness Ra(r) in a radial direction of the disk with respect to a surface roughness Ra(c) in a circumferential direction of the disk is greater than 1 and Ra(c) is 0.2 nm to 0.8 nm.

2. A glass substrate for a magnetic disk according to claim 1, wherein the glass substrate is a glass disk comprising an aluminosilicate glass.

3. A glass substrate for a magnetic disk, which is obtained by forming, on a principal surface of a glass disk, a first texture and thereafter forming a second texture for imparting a magnetic anisotropy to a magnetic layer of the magnetic disk, wherein the first and second textures are cooperatively superposed and combined, the first texture comprises at least one of protrusions and recesses, which are continuously or discretely distributed, and a ratio Ra(r)/Ra(c) of a surface roughness Ra(r) in a radial direction of the disk with respect to a surface roughness Ra(c) in a circumferential direction of the disk is greater than 1 and Ra(c) is 0.2 nm to 0.8 nm.

4. A glass substrate for a magnetic disk according to claim 1 or 3, wherein the magnetic disk has a diameter not greater than 48 mm.

5. A magnetic disk, operable in connection with a magnetic head frying and traveling over said magnetic disk, comprising:

a glass substrate;

a texture formed on at least an inner region of a principal surface of said glass substrate, wherein the texture is obtained by cooperatively superposing and combining a first texture and a second texture for imparting a magnetic anisotropy to a magnetic layer of the magnetic disk, wherein the first texture comprises at least one of protrusions and recesses, which are continuously or discretely distributed, and a ratio Ra(r)/Ra(c) of a surface roughness Ra(r) in a radial direction of the disk with respect to a surface roughness Ra(c) in a circumferential direction of the disk is greater than 1 and Ra(c) is 0.2 nm to 0.8 nm.

6. The magnetic disk according to claim 5, wherein the glass substrate is a glass disk comprising an aluminosilicate glass.

7. A magnetic disk, having a magnetic layer and being operable in connection with a magnetic head flying and traveling over said magnetic disk, comprising:

a glass disk having a principal surface;

a first texture formed first on said principal surface of said glass disk, and a second texture subsequently formed on said principal surface of said glass disk, said second texture being operative to impart a magnetic anisotropy to the magnetic layer of the magnetic disk, wherein the first and second textures are cooperatively superposed and combined, the first texture comprises at least one of protrusions and recesses, which are continuously or discretely distributed, and a ratio Ra(r)/Ra(c) of a surface roughness Ra(r) in a radial direction of the disk with respect to a surface roughness Ra(c) in a circumferential direction of the disk is greater than 1 and Ra(c) is 0.2 nm to 0.8 nm.

8. The magnetic disk according to claim 5 or 7, wherein the magnetic disk has a diameter not greater than 48 mm.

9. A magnetic disk according to any one of claims 5 through 6 with at least a magnetic layer, a protection layer, and a lubrication layer formed on the glass substrate.

* * * * *